United States Patent [19]

Ohnishi et al.

[11] 4,337,398
[45] Jun. 29, 1982

[54] DEVICE FOR CORRECTING DISPLACEMENT OF FORM SLIDE IN A LIGHT BEAM SCANNING TYPE RECORDING SYSTEM

[75] Inventors: Masahiro Ohnishi; Tsutomu Kimura, both of Asaka, Japan

[73] Assignee: Fuji Photo Film Co., Ltd., Minami-ashigara, Japan

[21] Appl. No.: 178,585

[22] Filed: Aug. 15, 1980

[30] Foreign Application Priority Data

Aug. 16, 1979 [JP] Japan .................................. 54-104421

[51] Int. Cl.³ .......................................... G01N 21/86
[52] U.S. Cl. .................................. 250/548; 250/557; 356/401
[58] Field of Search ............... 250/548, 557; 356/400, 356/401

[56] References Cited

U.S. PATENT DOCUMENTS 4,167,677  9/1979  Suzki ............................. 250/548 X

*Primary Examiner*—David C. Nelms
*Assistant Examiner*—Darwin R. Hostetter
*Attorney, Agent, or Firm*—Fleit & Jacobson

[57] ABSTRACT

In a light beam scanning type recording system in which a part of a read-out light beam scans a form slide and another part of the read-out light beam scans a linear encoder to generate photoelectric pulses, a data signal is read out by use of a video clock signal, and a recording light beam is modulated by a video signal obtained by combination of the data signal and the form signal, a device for correcting displacement of the form slide from a predetermined position with respect to the data information is provided. An optical mark is provided on the form slide in the marginal area thereof and a mark signal is generated when the read-out light beam passes through the optical mark. The number of clock pulses from a pulse generator is counted after the mark signal is generated and before the first photoelectric pulse is outputed to detect the amount of displacement of the form slide. Then, the video clock signal or the form signal is delayed according to the detected amount of displacement.

2 Claims, 4 Drawing Figures

DEVICE FOR CORRECTING DISPLACEMENT OF FORM SLIDE IN A LIGHT BEAM SCANNING TYPE RECORDING SYSTEM

BACKGROUND OF THE INVENTION

1. Field of the Invention

This invention relates to an improvement in a light beam scanning type recording system which records data on a recording material in a dot pattern by raster scanning of a light beam as of a laser, and more particularly to a device for correcting displacement of fixed information such as a form of tables, titles, etc. from data information to be entered in the form by automatically correcting the relative position of a form slide with respect to a linear encoder.

2. Description of the Prior Art

A light scanning type recording system which records data on a recording material is used, for instance, in a laser COM (computer output microfilmer) which records a computer output data on a microfilm. In the laser COM is used a laser beam as a light beam for recording data on the microfilm. Two laser beams of different wavelength, one for read-out and the other for recording, are used in combination. After the two laser beams have been composed into a single light beam, the light beam is deflected by a two-dimensionally deflecting system. A part of the read-out laser beam is used for scanning a form slide carrying form information as of characters and frame lines of a table to provide a form signal, and another part of the read-out laser beam is used for scanning a linear encoder to provide photoelectric pulse signals for making a video clock signal for data read-out and recording. By use of the video clock signal the computer output data are read out and combined with the form signal obtained from the form slide, and the video signal thus obtained is used for modulating the recording laser beam for recording the computer output data combined with the form on a recording material such as a microfilm.

As described above, a video clock signal is generated on basis of the raster scanning of a linear encoder, and the data information is read out by use of the video clock signal. On the other hand, the form slide is raster scanned to provide a form information signal. Then, the data information and the form information are combined together for recording the desired information on a recording material.

Thus, the form information and the data information are outputed independently of each other. Therefore, when the form slide and the linear encoder are not set at the correct positions, the form information and the data information are not combined correctly, and the data may be for instance recorded right on the frame lines and becomes illegible.

In general, in case that the form slide is of the fixed type, the relative position of the form slide with respect to the linear encoder is adjusted at the time of manufacture of the system, and accordingly there is no fear of causing the above mentioned errors in the recording process.

On the other hand, in case that the form slide is of interchangeable type in which, for instance, a number of form slides are retained in a cassette and a desired one of the form slides is automatically selected and set at the recording position, there is a possibility that the form slide is not accurately set at the correct position and the form slide is not correctly combined with the data information on the recording material. In more detail, the form slide which is normally clamped by a clamp and pushed into a recording station along a guide rail or the like is sometimes not pushed into a predetermined correct position in the recording station. In such a case, the form information obtained from the form slide cannot be correctly combined with the data information.

SUMMARY OF THE INVENTION

The primary object of the present invention is to provide a device for regulating the relative position of the form slide with respect to the data and preventing the displacement of the relative position of the form information with respect to the data information on the recording material.

A more specific object of the present invention is to provide a device for regulating the relative position of the form slide with respect to the linear encoder to prevent the form information from being displaced from the correct position with respect to the data information recorded on a recording material.

The device for regulating the relative position of the form slide with respect to the linear encoder in accordance with the present invention is characterized in that the form slide is provided with an optical mark in a marginal blank portion thereof and a mark signal is obtained by scanning the optical mark. On the other hand, a photoelectric pulse signal is obtained by scanning the linear encoder. By measuring the time interval between the generation of the photoelectric pulse signal and the generation of the mark signal, the displacement of the form slide from the correct position with respect to the linear encoder is detected, and the video clock signal or the form signal is delayed according to the amount of the displacement.

The optical mark may be located either at the position where it is scanned before scanning the linear encoder or at the position where it is scanned after scanning the linear encoder. In the former case, the time from the generation of the mark signal to the generation of the first photoelectric pulse signal is measured. In the latter case, the time from the generation of the last photoelectric pulse signal (detected by use of a monostable multivibrator having a time constant longer than the period of the photoelectric pulse) to the generation of the mark signal is measured.

By calculating the displacement or difference between the measured time period and the time period determined by design, it is possible to know the displacement of the form slide from the correct position with respect to the linear encoder in the direction of scanning. By delaying the video clock signal or the form signal according to the amount of displacement, the displacement of the form information from the data information on the recording material caused by the error in the set position of the form slide can be corrected.

DESCRIPTION OF THE PREFERRED EMBODIMENT

Now the invention will be described in detail with reference to the accompanying drawings.

Figure 1:
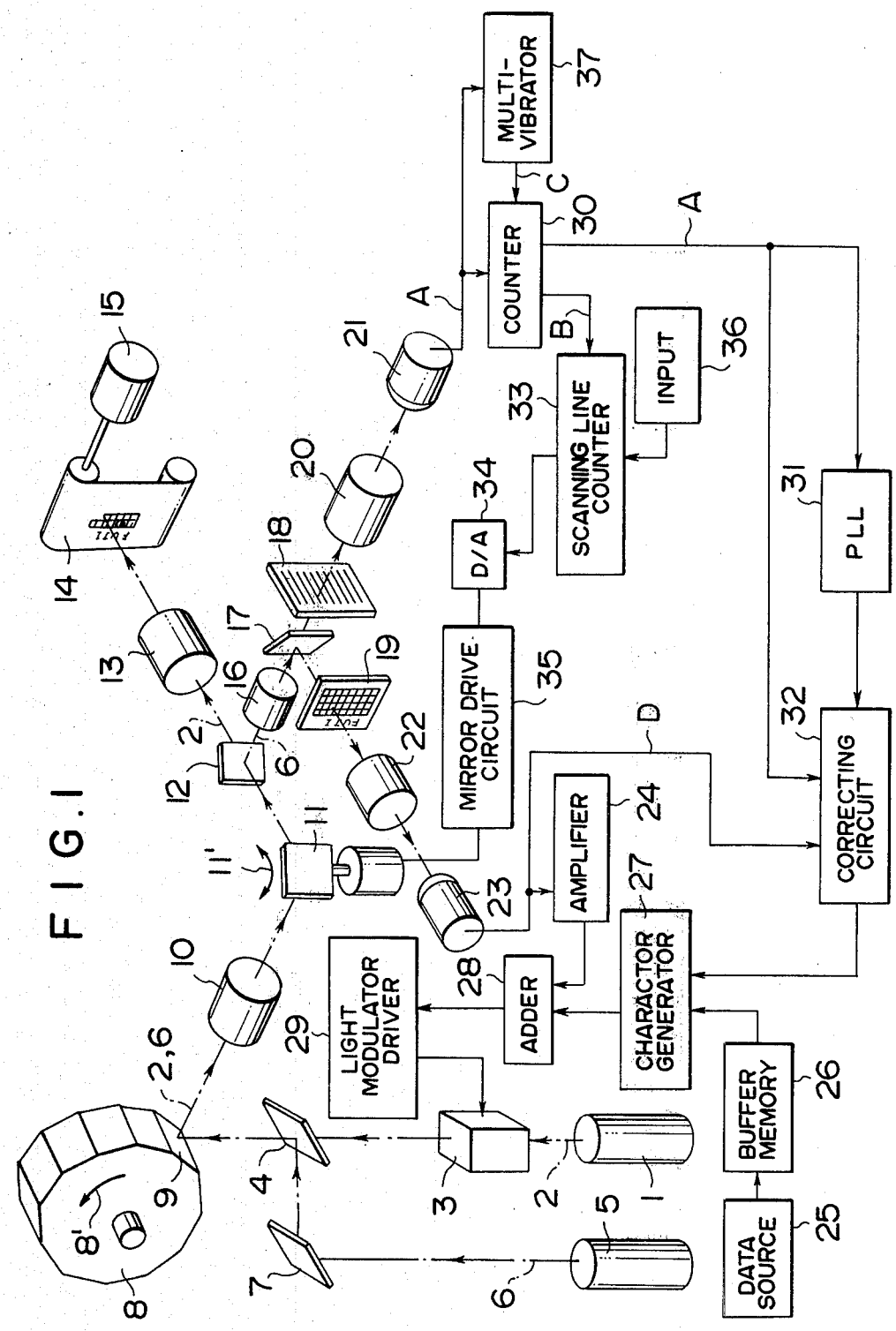
FIG. 1 is a block diagram showing the whole system of the laser beam scanning type recording system in which the present invention is employed.

Referring to FIG. 1, a laser beam source 1 such as an argon ion laser which emits blue and green laser beams emits a laser beam 2 for recording. The recording laser beam 2 transmits through a dichroic mirror 4 after passing through a light modulator 3 in which it is amplitude-modulated by a video signal hereinafter described. On the other hand, another laser source 5 such as a helium-neon laser which emits red laser beam emits a laser beam 6 for reading out information. The read-out laser beam 6 is reflected by a mirror 7 and then is further reflected by said dichroic mirror 4, whereby it is merged in the recording laser beam 2 and advances in the same optical path as the latter. The dichroic mirror 4 transmits blue and green light and reflects red light.

The composite laser beams 2 and 6 advancing from the dichroic mirror 4 impinge upon the reflecting surface 9 of a rotating polygonal mirror 8 rotating at a constant speed in the direction of arrow 8' and are deflected thereby. Then, the composite laser beam 2,6 advances toward a galvanometer mirror 11 through a first focusing optical system 10. The deflection performed by the rotating polygonal mirror 8 will hereinbelow be referred to as horizontal deflection. The galvanometer mirror 11 vibrates in the direction of arrow 11 by a saw tooth signal as described hereinafter and deflects the composite laser beam 2,6 in the direction perpendicular to the direction of said horizontal deflection. The deflection performed by the galvanometer mirror 8 will hereinbelow be referred to as vertical deflection. It should be noted that in FIG. 1 the rotating mirror 8 is illustrated to deflect the laser beam vertically and the galvanometer mirror 11 is illustrated to deflect the laser beam horizontally for the sake of illustration's convenience.

As the laser beam is deflected once by one reflecting surface 9 of the rotating polygonal mirror 8, the laser beam is vertically deflected by one unit by the galvanometer mirror 11. Thus, the laser beam is two-dimensionally deflected and scans by parallel scanning lines on a recording material and so forth. This scanning in a two-dimensional pattern will hereinbelow be referred to as raster scanning.

The vertically deflected laser beam composite 2,6 is then separated by another dichroic mirror 12 into a recording laser beam 2 and a read-out laser beam 6. The recording laser beam 2 transmitting through the dichroic mirror 12 is focused by a second focusing optical system 13 and scans a recording material 14 in the form of a small light spot by raster scanning. The recording material 14 is moved by a driving means 15 like a motor after the recording laser beam 2 has completed recording of one image frame by raster scanning. Thus, the recording material 14 is fed one frame by one frame each time the laser beam 2 has completed raster scanning of one frame. The driving means 15 may be of any type and is selected properly according to the type of the recording material 14 and the format of the image frames recorded thereon, e.g. a single line of image frames on roll film or two dimensional arrangement in the form of microfiche.

On the other hand, the read out laser beam 6 is reflected by the dichroic mirror 12 and focused by a third focusing optical system 16. The focused read out laser beam 6 partly transmits through a beam splitter 17 and raster-scans on a linear encoder 18 in a small light spot and partly is reflected by the beam splitter 17 and raster-scans on a form slide 19 bearing a form consisting of frame lines and characters in a small light spot.

The linear encoder 18 is a plain plate having a number of elongated transparent portions and opaque portions extending in the direction of vertical deflection arranged alternately in the direction of horizontal deflection at fixed intervals. The laser beam impinging upon the linear encoder 18 transmits through the transparent portions thereof and does not transmit through the opaque portions thereof. Therefore, a photoelectric pulse signal A can be obtained by providing a photodetector 21 behind the linear encoder 18 via a fourth focusing optical system 20 to receive the laser beam which transmits through the linear encoder 18.

The read-out laser beam reflected by the beam splitter 17 transmits through the form slide 19 in the areas bearing no information of the form and does not transmit through the areas bearing information of the form. Therefore, an ON-OFF signal representing the image of the form carried by the form slide 19 can be obtained by providing a photodetector 23 behind the form slide 19 via a fifth focusing optical system 22 to receive the laser beam transmitting through the form slide 19.

The data consisting of character information and the like to be recorded are memorized in an information source 25 such as a computer, a magnetic tape or the like in the form of coded signal. The coded signal is once memorized in a buffer memory 26, and then outputed therefrom and inputed into a character generator 27 at a speed different from the speed at which the data are memorized in the buffer memory 26. The character generator 27 generates a data video signal according to the video clock signal described hereinafter. The data video signal is composed with a form video signal at an adding circuit 28 and then put into a light modulator 3 after amplified by a light modulator driver 29.

Thus, the recording laser beam 2 is modulated through the light modulator 3 by a video signal composed of the data information and the form information. The modulation is of ON-OFF type and the recording laser beam 2 records the data with the form information on the recording material 14 in the form of dots. The form video signal is obtained by amplifying the output of the photodetector 23 which represents the image of the form by means of an amplifier 24.

The video clock signal is used for giving a timing of generating a video signal so as to generate dots at equal intervals in a predetermined range of the scanning lines. For generating the video clock signal, the photoelectric pulse signal A obtained from the linear encoder having the transparent portions arranged at equal intervals is used. In other words, the photoelectric pulse signal A is sent to a PLL circuit 31 through a counter 30, where it is multiplied by n-times into a video clock signal. The video clock signal thus obtained is sent to the character generator 27 after delayed through a correcting circuit 32 which constitutes the main portion of the present invention.

The counter 30 functions to send the photoelectric pulse signal A to the PLL circuit 31 and counts the photoelectric pulse signal A to detect the scanning position of the light beam in the horizontal scanning direction. Then, after the predetermined number of photoelectric pulses of the signal A has been counted, the galva-up signal B is outputed and sent to a scanning line counter 33.

The scanning line counter 33 counts the number of scanning lines and gives an output to a D-A converter 34 where it is converted to an analog signal.

The analog signal outputed from the D-A converter 34 is inputed into a galvanometer mirror drive circuit 35 and the galvanometer mirror 11 is deflected thereby. When the scanning line counter 33 shows a count "zero", the direction of deflection of the galvanometer mirror 11 is set in the direction of forming the uppermost scanning line in the raster scanning, and as the counted value of the scanning line counter 33 increases as the galva-up signal B increases, the galvanometer mirror 11 is rotated as the increase of the counted value and deflects the scanning line vertically. In general, the galvanometer mirror 11 performs vertical deflection in the above described manner and when one raster scanning has been completed the scanning line counter 33 is cleared to zero and set to be prepared for the raster scanning for the subsequent frame scanning.

In order to speed up the recording operation, it is desired that the vertical scanning is commenced at the scanning line on which the data video signal is first brought in without clearing the scanning line counter 33 to zero every time the scanning is changed from one frame to another.

When the form slide 19 is selected and inserted to the predetermined position at the scanning station in the direction of arrow 19', there occurs displacement of the form slide from the predetermined correct position. In checking the displacement, the galvanometer mirror 11 is deflected to the checking position. For this purpose, the scanning line counter 33 is set at the predetermined value by a signal from an input means 36.

A multi-vibrator 37 is provided for resetting the counter 30, in which the time constant is set longer than the period of the photoelectric pulse signal A. The multi-vibrator 37 is set by a photoelectric pulse A which comes first on each scanning line and turned to level "L" when a predetermined time has lapsed since the last photoelectric pulse A is inputed. The output signal C of the multi-vibrator is input into the counter 30 and resets the same. Then, immediately before the counter 30 is reset, the light beam is returned to the starting position of the next scanning line.

As the galvanometer control system and the above-described correcting circuit 32, a micro-computer is used and the desired control and the displacement correction are conducted according to the program.

Figure 2:
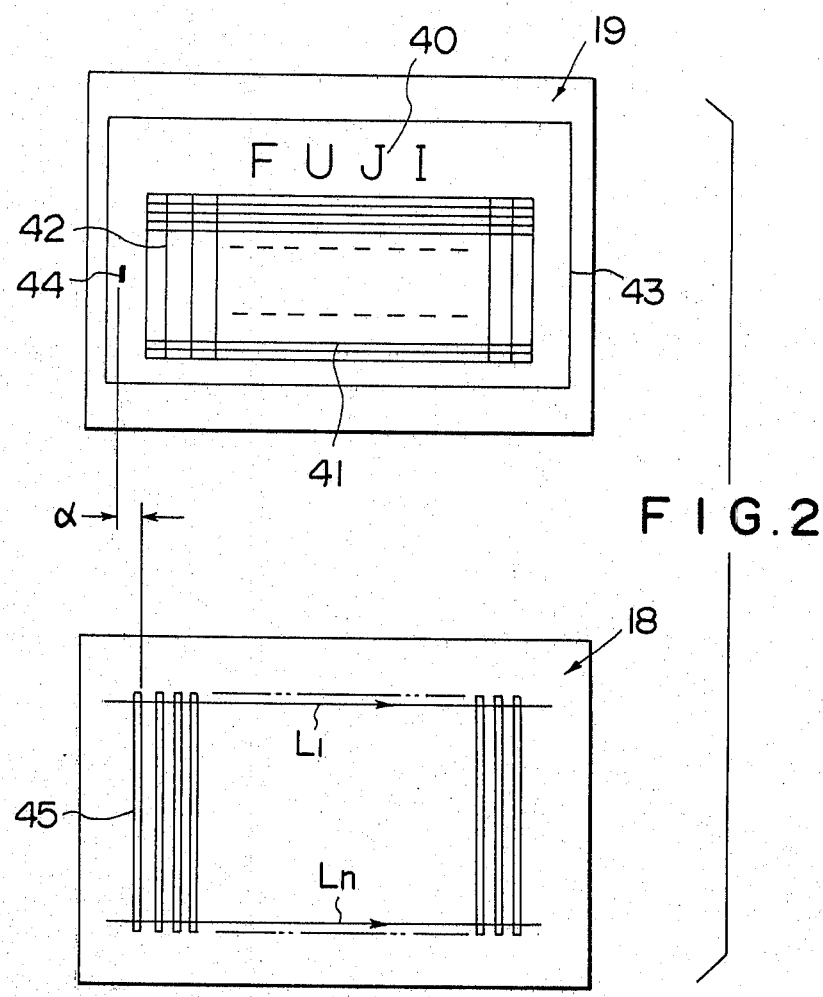
FIG. 2 is a front view showing the relative position of a form slide and a linear encoder employed in this invention.

FIG. 2 shows a relationship between the form slide and the linear encoder. The form slide 19 carries information such as characters 40, horizontal frame lines 41, vertical frame lines 42 and other necessary fixed information. The form information like these is composed with data information outputed by a computer and recorded on a recording material 14 together therewith.

In FIG. 2, a rectangular line 43 shown on the form slide 19 indicates an effective image area which is raster scanned by a light beam. Within this effective area 43 and outside the frame lines 41 and 42, i.e. in a marginal area, an optical mark 44 is provided. Since the optical mark 44 is recorded on the recording material together with the information, the size of the optical mark 44 should preferably be small.

In the linear encoder 18, transparent portions 45 in the form of stripes having the same width are arranged at equal intervals on an opaque plate. In FIG. 2, the scanning line L1 shows the first scanning line in the raster scanning and Ln shows the last scanning line. The area enclosed by the two extreme scanning lines L1 and Ln corresponds to the effective area 43 of the form slide 19.

As obvious from FIG. 2, the horizontal length of the area occupied by the transparent stripes 45 is a little smaller than the length of deflection of the read-out light beam 6 deflected by the polygonal mirror 8, and the vertical length thereof is a little larger than the length of deflection of the read-out light beam 6 deflected by the galvanometer mirror 11. In other words, the raster formed by the read-out light beam 6 has a little longer horizontal length and a little shorter vertical length than the area covered by the stripes.

In case of a multi-form slide having a number of form slides, a form slide 19 is selected according to data and set at the projection station. Therefore, there is a possibility that the position of the selected form slide 19 is displaced from the correct position due to inaccurate setting thereof.

When the relative position of the form slide 19 with respect to the linear encoder 18 changes, it happens that the characters do not enter between frame lines 41 and 42 but lie on the frame lines 41 and/or 42. Then, by measuring the distance $\alpha$ between the optical mark 44 provided on the form slide 19 and the first transparent portion 45 of the linear encoder 18 and obtaining the difference between the measured distance and a standard value, it is possible to know the displacement of the form slide 19 from the correct position to be set at.

Referring to FIG. 1, when measuring the relative position of the form slide 19 with respect to the linear encoder 18, a signal is sent from the input means 36 to the scanning line counter 33 and the galvanometer mirror 11 is forced to rotate until the scanning line crosses the optical mark 44. Then, the light modulator 3 is turned OFF and the recording light beam 2 is cut off so that only the read-out light beam 6 is guided to the rotating polygonal mirror 8 to perform the horizontal scanning.

Figure 4:
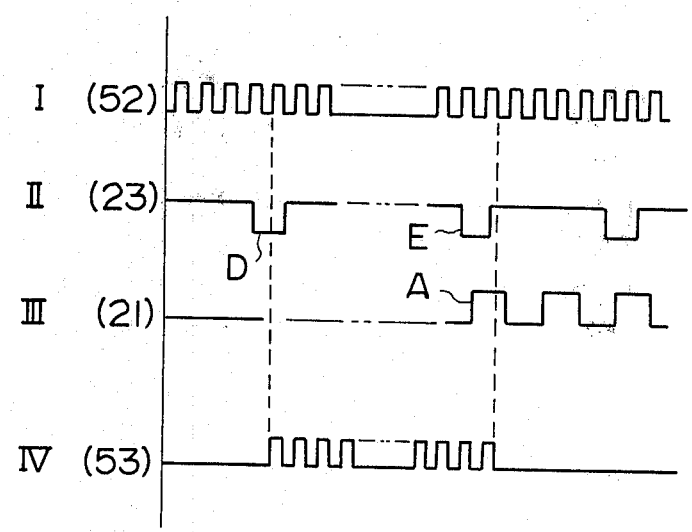
FIG. 4 is a timing chart showing the various pulse signals obtained and handled in the laser beam scanning type recording system in accordance with the present invention as shown in FIG. 1 in which I is high frequency pulses generated by a pulse generator, II is the output of a photodetector behind a form slide, III is the output of a photodetector behind a linear encoder, and IV is the output of a counter used in the circuit shown in FIG. 3.

As shown in FIG. 4, when the read-out light beam 6 passes through the optical mark, the photodetector 23 outputs a mark signal D. As the read-out light beam 6 is further deflected, the light beam passes through the vertical frame line 42, and accordingly a form signal E is outputed from the photodetector 23.

On the other hand, since the linear encoder 18 is also scanned, a photoelectric pulse signal A is outputed from the photodetector 21 every time the read-out light beam passes through the transparent portions 45.

Figure 3:
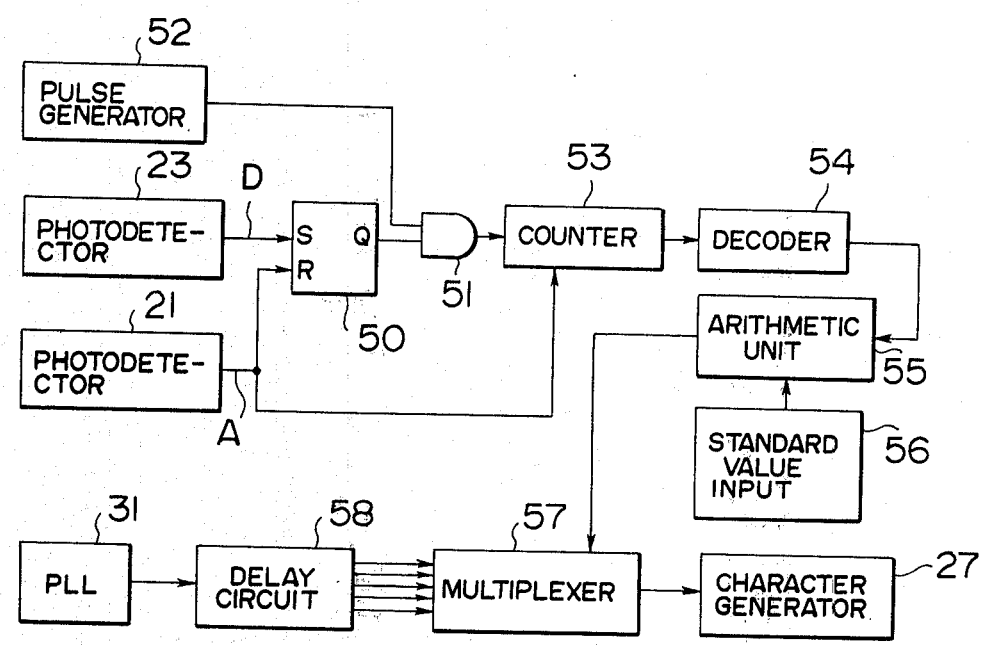
FIG. 3 is a block diagram showing the circuit for correcting the displacement of the position of the form slide with respect to the linear encoder employed in the present invention.

Referring to FIG. 3, by the mark signal D, a flip-flop 50 is set and by the first photoelectric pulse it is reset. When the flip-flop 50 is set, an AND gate 51 is opened and accordingly a high frequency pulse signal of about 30 MHz from the pulse generator 52 is put into a counter 53. Therefore, the counter 53 counts the number of pulses during the time period from the generation of the mark signal D to the output of the first photoelectric pulse A. Further, the counter 53 is reset simultaneously with the flip-flop 50 by the photoelectric pulse signal A.

The counted value at the counter 53 is decoded by a decoder 54 and then sent to an arithmetic unit 55, where a standard value sent from a standard value input circuit 56 is subtracted therefrom.

At the arithmetic unit 55 the amount of displacement of the set position of the form slide 19 is calculated and the code signal showing the amount of displacement is forwarded to a multiplexer 57. The multiplexer 57 is provided with a number of switch elements which are connected with the output terminals of a delay circuit 58.

The delay circuit 58 is provided with a number of output terminals and outputs a signal which is delayed from the input signal by a predetermined time period. The input terminal of the delay circuit 58 is connected with said PLL circuit 31 to be provided with an input of the video clock signal outputed from the PLL circuit 31. Therefore, the multiplexer 57 is switched according to the amount of displacement from the standard position to select an output terminal of the delay circuit 58. By the delay circuit 58, the video clock signal is delayed according to the amount of displacement and then inputed into the character generator 27.

Therefore, by measuring the displacement of the relative position of the form slide 19 with respect to the linear encoder 18 when the form slide is changed and by determining the delay time of the video clock signal according to the amount of displacement, the displacement is electrically corrected and the characters are prevented from falling on the frame lines 41 and/or 42.

In general, the displacement of the relative position may sometimes larger than the standard value (+) and sometimes smaller than the standard value (−). Therefore, it is desirable that the delay time effected by the delay circuit 58 is made mediate in case of the standard value.

We claim:

1. In a light beam scanning type recording system in which a read-out light beam and a recording light beam are deflected by means of a two-dimensionally light deflecting means, a part of the read-out light beam performs raster scanning of a form slide to generate a form signal, another part of the read-out light beam performs raster scanning of a linear encoder to generate a photoelectric pulse signal, a data signal is read out by use of a video clock signal obtained by multiplying said photoelectric pulse signal by n-times, and a recording light beam is modulated by a video signal obtained by combining said data signal with said form signal to record the combination of the form and the data on a recording material, a device for correcting displacement of the form slide from a predetermined position with respect to the data information recorded on the recording material comprising an optical mark provided on said form slide, means for generating a mark signal when said read-out light beam passes through said optical mark, means for counting clock pulses from a pulse generator until when a predetermined photoelectric signal is outputed since said mark signal is generated, means for detecting the amount of displacement of said form slide in the direction of scanning based on the counted number of the clock pulses, and means for delaying the video clock signal or the form signal according to the detected amount of displacement.

2. A device for correcting displacement of a form slide in a light beam scanning type recording system as defined in Claim 1 further comprising a flip-flop which is set by said mark signal and reset by said photoelectric pulse signal, a pulse generator, an AND gate for input of output signals from said flip-flop and said pulse generator; a counter for counting the clock pulse signal passing through the AND gate, an arithmetic unit for subtracting a predetermined value from the counted value obtained by the counter, a multiplexer for performing switching according to the results of operation by said arithmetic unit, and a delay circuit having a number of output terminals for outputing the video clock signals with different time delay in which only a desired output terminal is selected by said multiplexer.

* * * * *